C. C. LAMB.
CAMERA STAND.
APPLICATION FILED DEC. 20, 1910.

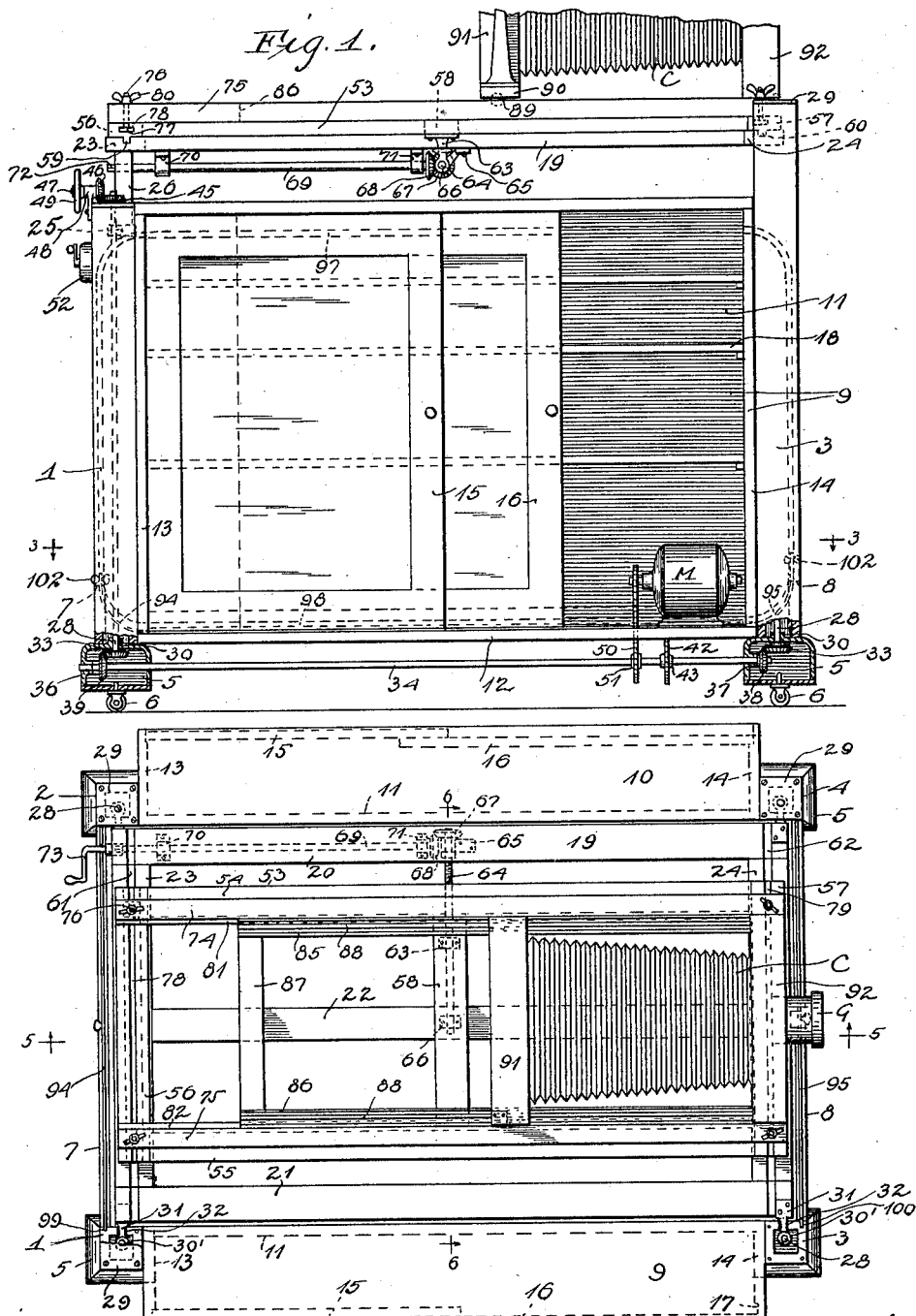

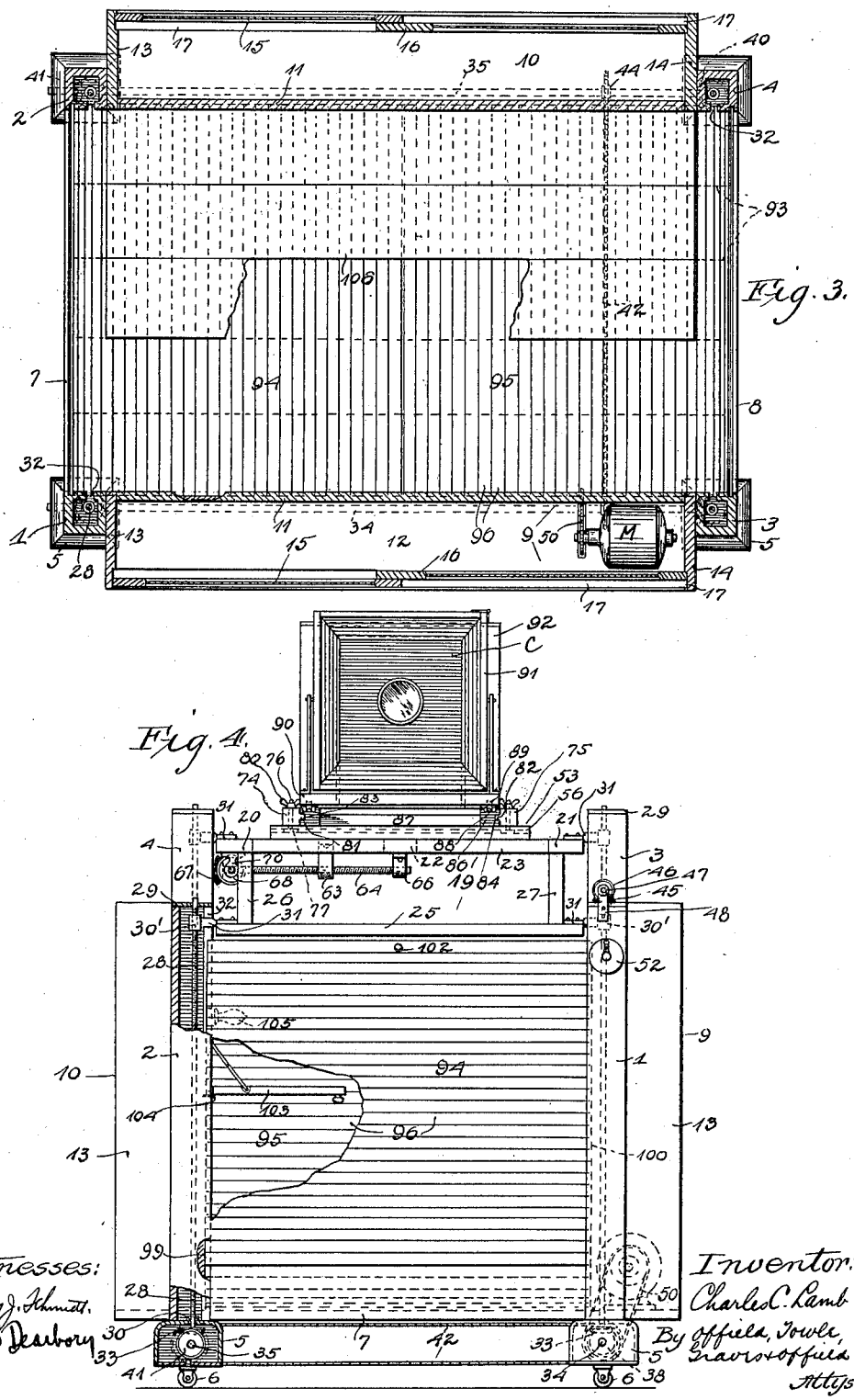

1,032,614.

Patented July 16, 1912.
3 SHEETS—SHEET 3.

Witnesses:
Charles J. Schmidt.
Nellie B. Dearborn

Inventor:
Charles C. Lamb
By Offield, Towle, Graves & Offield.
Attys.

UNITED STATES PATENT OFFICE.

CHARLES CALVERT LAMB, OF JOLIET, ILLINOIS, ASSIGNOR OF FORTY-NINE ONE-HUNDREDTHS TO WILLARD M. McEWEN, OF CHICAGO, ILLINOIS.

CAMERA-STAND.

1,032,614.        Specification of Letters Patent.      Patented July 16, 1912.

Application filed December 20, 1910. Serial No 598,370.

*To all whom it may concern:*

Be it known that I, CHARLES CALVERT LAMB, residing at Joliet, in the county of Will and State of Illinois, have invented certain new and useful Improvements in Camera-Stands, of which the following is a specification.

My invention relates to camera stands, and contemplates a number of improved features in construction and operation highly desirable in the photographic art.

Among the important objects of my invention are to provide a substantial stand more or less in cabinet form, having a supporting platform with adjustable rail mechanism for accommodating cameras of varying sizes; to provide mechanism for enabling the platform to be raised or lowered readily and accurately either by hand or by power, and so that the platform will always be in a horizontal plane; to provide mechanism whereby the supporting rail frame may be moved laterally on the platform always in horizontal direction, this true horizontal adjustment, together with the above true vertical adjustment, enabling the camera to be kept level and plumb at all times and to keep the horizontal and vertical axes of the lens coincident with the horizontal and vertical axes of the object to be photographed, thus avoiding distortion and incorrect perspective; to so construct such adjusting mechanism that the adjusting features of the camera itself are not interfered with; to provide flexible closure walls for the cabinet, adapted to coöperate with the rigid walls thereof to form a light-tight compartment for accommodating and protecting the camera when not in use and for forming also a dark room in which the various photographic development, printing, and other steps can be performed; to provide compartments for receiving the various photographic paraphernalia, which compartments are adapted to be closed by suitable doors to be light proof; and in general, to provide an adjustable cabinet stand for cameras which will enable more efficient use and adjustment for photographic purposes and which will offer better protection both against light and dirt for the camera and other photographic parts and paraphernalia, and which can be always used as a dark room for photographic processes.

Figure 5:
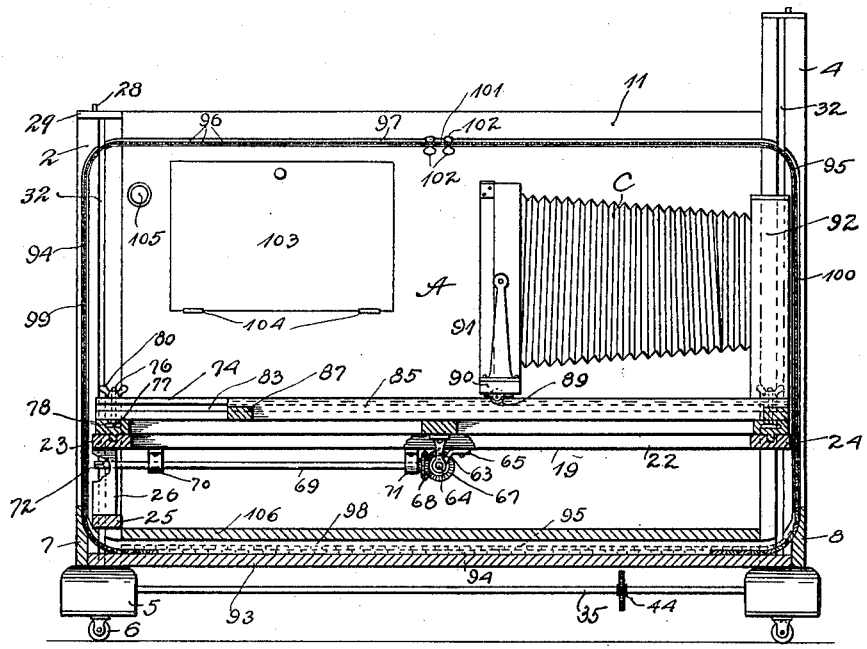
Figure 6:
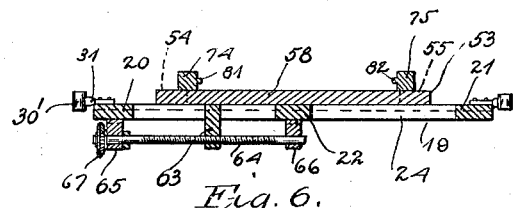

In the accompanying drawings, which illustrate one embodiment of my invention, Figure 1 is a side elevational view of a supporting cabinet structure, showing the lower part of a camera structure mounted thereon, Fig. 2 is a plan view, Fig. 3 is a sectional view taken on plane 3—3, Fig. 1, Fig. 4 is an elevational view taken from the left of Figs. 1 and 2. Fig. 5 is a sectional view taken on plane 5—5, Fig. 2, and Fig. 6 is an enlarged sectional view taken substantially on plane 6—6, Fig. 2, to show particularly mechanism for adjusting the camera track supporting frame on the main supporting platform.

Referring to these drawings, 1, 2 and 3, 4 represent main supporting vertical posts, each mounted on a hollow rectangular base 5 supported on a caster 6. Posts 1 and 2, and 3 and 4 are spaced transversely apart by cross boards 7 and 8 respectively, rigidly secured to the posts above the base frames thereof, and posts 1 and 3, and 2 and 4 are spaced longitudinally apart by compartment structures designated as a whole 9 and 10, respectively, rigidly secured to the posts, these compartment structures, together with the cross boards, rigidly supporting the posts in vertical position and alinement. Each compartment structure comprises a rear wall 11, a floor 12, side walls 13 and 14, and suitable doors 15 and 16. The doors shown are of the sliding kind and operate in grooves 17, so as to exclude all light when the doors are in closed position. Each compartment may also be provided with shelving 18 suitably arranged for the accommodation of photographic paraphernalia.

The main supporting platform or elevator frame, designated as a whole 19, is skeleton in form, comprising side strips 20 and 21, intermediate strip 22, and end strips 23 and 24, also a cross strip 25 suspended below and parallel with the front end strip 23 by blocks 26 and 27. This platform structure is adapted to be vertically raised and lowered by means of mechanism which will now be described.

Each of the posts 1, 2, 3 and 4 is hollow to accommodate a vertical rod 28 of spiral form or screw-threaded, as best shown in Fig. 4, each rod extending at its upper end through a bearing cap 29 secured to the top of the post and at its lower end having bearing 30 in the upper wall of the base frame 5 for the post. Each rod also receives in threaded engagement a sleeve 30′ forming part of a bracket 31 adapted to be secured to the platform structure, so that upon turning of the rods, this platform structure will be raised or lowered. Each post has the longitudinal slot 32 cut in its inner wall in line with the rod 28 therein, through which slot the bracket members 31 extend. As best shown in Fig. 4, the brackets engaging with the threaded rods in the rear post 1 and 2 are secured to the ends of the strip 25 of the platform structure, while the brackets engaging the threaded rods in the front posts 3 and 4 are secured to the front ends of the side strips 20 and 21 of the platform structure. The rear posts 1 and 2 are preferably shorter than the front posts 3 and 4 by an amount equal to the distance between the strips 23 and 25 of the platform structure, so that there will be less obstruction to the manipulation of the adjusting members and of the camera.

Mechanism is preferably provided for simultaneously rotating all the rods 28 so that the platform structure will move accurately in vertical direction and the top supporting surface thereof will always be in a horizontal plane. This control of the rods can either be by hand or by power. Disposed within the base frame of each post and secured to the lower end of the corresponding rod 28 is a bevel gear 33. Extending between posts 1 and 3, and 2 and 4, respectively, are shafts 34 and 35, shaft 34 having bearing at 36 in the outer wall of the base frame 5 of post 1, and at its other end having bearing at 37 in the inner wall of the base frame 5 of post 3. Within the base frame of post 3, shaft 34 carries a bevel gear 38, which meshes with the bevel gear 33 on the rod 28 within said post, and at its rear end the shaft carries a bevel gear 39 meshing with the gear 33 on rod 28 running through post 1, bevel gears 37 and 39 engaging with the gears 5 to the rear of the rods 28, so that rotation of shaft 34 will cause rotation in the same direction of the rods in posts 1 and 3. In the same manner the shaft 35 at its front and rear ends carries bevel gears 40 and 41 respectively, meshing with the gears 33 at the lower ends of the rods 28 in posts 2 and 4. The shafts 34 and 35 are connected to rotate at the same speed by means of a chain 42 engaging sprocket wheels 43 and 44 mounted on the respective shafts. In order to manually control the simultaneous rotation of the four rods 28, one of the rods, as for example, the rod in post 1, is provided at its upper end with a bevel gear 45, with which meshes a bevel gear 46 mounted on the front end of shaft 47 journaled in a bearing frame 48 suitably secured to the post, and the rear end of the shaft may be provided with a crank or with a hand wheel 49, as shown. Upon turning of this wheel the resultant rotation of rod 28 in post 1 will be communicated through the various gears, shafting, and chain, to the other rods, and the rods will all rotate at the same rate, and the platform structure will be raised uniformly at its four corners, and its top surface will always be in a horizontal plane. In order to drive the rods by power an electric motor M is provided, and may be conveniently mounted on the floor of compartment 9, the motor being coupled to shaft 34 by means of a chain belt 50 engaging sprocket wheel 51 on said shaft. A suitable switch 52 for controlling the electric circuits (not shown) for the motor, may be mounted on post 1 in the most accessible position. In practice, approximate adjustment of the platform structure can be quickly made by operating the motor, and the finer and final adjustment can then be effected by turning of the hand wheel 49.

Mounted on the platform or elevator structure 19 is a rail supporting frame designated as a whole 53 and comprising side strips 54 and 55, end strips 56 and 57, and an intermediate cross strip 58. This frame is adapted for transverse reciprocation on top of the platform 19, the end strips 56 and 57 being provided with longitudinal tongues 59 and 60 respectively which engage in longitudinal guide grooves 61 and 62 provided in the end strips 23 and 24 respectively of the platform frame. Depending from the intermediate strip 58 of frame 53 is a bracket 63 having at its lower end threaded engagement with a horizontal screw shaft 64 whose ends are journaled in brackets 65 and 66 depending respectively from the side and intermediate strips 20 and 22 respectively of the platform frame 19, so that turning of the screw shaft will cause transverse reciprocation of frame 23 on frame 19. The outer end of the screw shaft carries a bevel pinion 67, which meshes with a bevel pinion 68 secured to the front end of a shaft 69 which is journaled in brackets 70 and 71 depending from the side strip 20 of frame 19. (Figs. 5 and 6). The rear end 72 of shaft 69 is below the rear strip 23 of frame 19 and is squared for receiving a detachable crank handle 73 (Fig. 2). Upon turning of the crank, shaft 64 will be rotated and adjustment of frame 53 effected.

On the top of frame 53 are the supporting rail bars 74 and 75 which extend parallel with the sides of frames 19 and 53 and which may be adjusted away from or toward each other to accommodate various sizes of camera beds. Such adjustment may be effected by the arrangement shown, comprising bolts 76 extending through the ends of the rails with their heads 77 in the T-shaped grooves 78 and 79 cut longitudinally in the end strips 56 and 57 respectively of frame 53, thumb nuts 80 being provided for the screws. The supporting rail bars 74 and 75 have longitudinal tongues 81 and 82 respectively for receiving the longitudinal grooves 83 and 84 of the side bars 85 and 86 of the camera bed frame 87, this bed frame being, therefore, adapted for longitudinal adjustment along the rail bars and frame 53. The side bars 85 and 86 of the camera bed frame have rail beads 88 for receiving rollers 89 pivoted to the truck 90 for supporting the rear frame 91 of a camera C, the front frame 92 of the camera being rigidly secured to the front ends of the bars 85 and 86.

With the arrangement thus far described, the camera itself can be adjusted longitudinally on the side bars 85 and 86 of the camera bed frame, the bed frame with the camera thereon can be adjusted longitudinally along frame 53, the frame 53 can be adjusted transversely over platform frame 19, and the platform frame can be raised and lowered, these various adjustments being such that the camera will always be level and plumb, and so that the horizontal and vertical axes of its lens G will always be parallel with the horizontal and vertical axes of the object to be photographed, thus assuring accurate and correct photography. By means of the various driving mechanisms, all controllable from the rear end of the camera, these various adjustments can be made with great certainty and accuracy.

It is very important that the camera be protected against dust and dirt. For protecting the camera when not in use provision is made for forming a dust and light proof compartment for receiving the camera. The side walls of this compartment are formed by the inner walls 11 of the side compartments 9 and 10 already referred to, and the bottom of this compartment is formed by a floor 93 extending between the lower ends of these inner walls 11, as best shown in Figs. 3 and 5. The end and top walls of the camera compartment are preferably provided with flexible curtains 94, 95, which may be in the well-known form of thin slats 96 hinged together to be light-proof. Suitable grooves are provided for receiving the sides of the curtains. As shown, horizontal grooves 97 are provided in the walls 11 near the tops thereof, and grooves 98 are provided in these walls adjacent the floor 93, while grooves 99 are provided in the inner sides of posts 1 and 2, and grooves 100 are provided in the inner sides of posts 3 and 4. As shown in Fig. 5, the camera platform has been lowered, and the curtains 94, 95 have been slid upwardly through slots 99 and 100 and longitudinally through slots 97, the ends of the curtains meeting at 101 so that the curtains, together with the side walls 11 and floor 93, form an inclosed compartment A for protecting the camera. To readily manipulate the curtains knobs 102 are provided thereon, as shown. Now when the camera is to be used the curtains are slid back and down, and their inner ends pass over each other on the floor 93, as indicated in dotted lines, Fig. 5. Where the stand structure is of sufficient size the compartment A will be sufficiently large to accommodate a person, and the compartment will act as a dark room in which developing, printing, and other photographic processes may be carried out. When the curtains are down, as shown in Fig. 1, entrance may be had into the interior from the ends of the structure and the curtains can then be slid up across the top, as shown in Fig. 5, to form the closed compartment. To afford a table for the operator within compartment A, a section 103 of one of the inner walls 11 may be cut out and hinged at 104, so that it may be swung downwardly in horizontal position, as indicated in Fig. 4, and a lamp 105 may be mounted on the wall adjacent the table. This door 103 will also give access from the inside to the compartment 10, in which photographic paraphernalia is stored. To protect the curtains 94 and 95, a false floor 106 may be provided above the floor 93, as shown. The stand structure, therefore, eliminates the necessity of a special dark room.

I do not desire to be limited to the precise construction, arrangement and operation shown and described, as many changes and modifications are of course possible which would still come within the scope of my invention, the main features of which are the provision of the construction involving a supporting platform adapted to be raised and lowered, together with a camera supporting structure thereon adapted to be adjusted horizontally, and movable walls which can coöperate with stationary walls to move an inclosure for the camera when not in use and to form a dark room for photographic processes.

I therefore claim the following:

1. In a camera supporting stand, the combination of vertical supporting members, a platform suspended between said members, means for effecting bodily vertical adjustment of said platform, a supporting frame mounted on said platform and adapted for transverse adjustment thereon, supporting rails extending longitudinally on said supporting frame, and a camera supporting bed frame longitudinally adjustable on said rails.

2. In a camera supporting and adjusting stand, the combination of vertical supporting walls, a platform suspended between said walls, means for effecting vertical adjustment of said platform, a supporting frame on said platform adapted for transverse adjustment thereon, and a camera supporting bed frame mounted on said supporting frame to be longitudinally adjustable thereon.

3. In a camera supporting and adjusting stand, the combination of vertical walls, a platform suspended between said walls, means for effecting vertical adjustment of said platform, said platform having transverse grooves, a supporting frame having transverse tongues for engaging in said grooves whereby said supporting frame may be transversely adjusted on said platform, rails extending longitudinally on said supporting frame and having longitudinal tongues, and a camera supporting frame having longitudinal grooves for receiving said tongues, whereby said camera supporting frame may be longitudinally adjusted on said supporting frame.

4. In a camera supporting and adjusting structure, the combination of vertical walls, a platform suspended between said walls, means for effecting vertical bodily adjustment of said platform from one horizontal plane to another, said platform having transverse grooves, an intermediate supporting frame having transverse tongues for engaging in said grooves whereby said intermediate frame may be adjusted transversely on said platform, rail bars extending longitudinally on said intermediate frame and adapted for transverse adjustment thereon, said bars having longitudinal tongues, and a camera supporting frame having longitudinal grooves for receiving said tongues whereby said camera supporting frame may be longitudinally adjusted along said bars.

5. In combination, four hollow vertical posts connected together to form a supporting frame, a threaded rod extending vertically through each post and journaled therein, a horizontal platform having extensions projecting into said posts and having threaded engagement with said rods, means for effecting simultaneous rotation of said rods to thereby effect vertical adjustment of said platform from one horizontal position to another, an intermediate frame mounted on said platform and adapted to be transversely adjusted thereon, and a camera supporting bed frame having longitudinal adjustment on said intermediate frame.

6. In a camera supporting stand, the combination of side walls connected together at their lower ends, a platform disposed between said walls, means for effecting vertical adjustment of said platform to various horizontal positions between said walls, camera supporting mechanism mounted on said platform, and collapsible end and top walls adapted to be associated with said side walls to form an inclosed compartment for receiving the lowered platform and camera mechanism mounted thereon.

7. In a camera supporting stand, the combination of side walls connected together at their lower ends, a platform disposed between said walls, means for effecting vertical adjustment of said platform to various horizontal positions between said walls, camera supporting mechanism mounted on said platform, and flexible curtains mounted on said side walls and adapted to be shifted to form end walls and a top wall for coöperating with said side walls to form a compartment for inclosing the lowered platform.

8. In a camera supporting and adjusting stand, the combination with side walls, a floor connecting between said side walls, a platform suspended between said walls, means for effecting vertical adjustment of said platform to any horizontal position between said walls, camera supporting and adjusting mechanism mounted on said platform, grooves formed in said side walls, and flexible curtains engaging in said grooves and adapted to be moved to various positions in said grooves, said curtains in one position forming end walls and a top wall for coöperating with the side walls and floor to form a closed compartment for the lowered platform and camera supporting mechanism thereon.

9. In a camera supporting and adjusting stand, the combination of side walls, a floor connecting said side walls, a platform suspended between said walls, means for effecting vertical adjustment of said platform between said walls, movable walls supported by said side walls and adapted in one position to form end walls and a top wall for coöperating with the side walls and floor to form an inclosed chamber, compartments formed on the outside of said side walls, and doors for said compartments.

10. In a camera stand, the combination of side walls and a floor, a camera supporting platform mounted between said walls, and movable doors supported from said side walls and adapted to be moved into position to form end walls and a top wall to coöperate with said side walls and floor to form an inclosed chamber.

In witness whereof, I hereunto subscribe my name this 12th day of December, A. D., 1910.

CHARLES CALVERT LAMB.

Witnesses:
 HENRY SIMS,
 D. C. MCNAMARA.

Copies of this patent may be obtained for five cents each, by addressing the "Commissioner of Patents, Washington, D. C."